United States Patent
Homer et al.

(10) Patent No.: US 7,551,428 B2
(45) Date of Patent: Jun. 23, 2009

(54) AUTOMATIC POWER CONTROL

(75) Inventors: Steven S. Homer, Tomball, TX (US);
Ronald E. Deluga, Spring, TX (US);
Darrell L. Brokmeyer, Magnolia, TX (US); Rahul V. Lakdawala, Cypress, TX (US); Jeffrey Kevin Jeansonne, Houston, TX (US); Paul N. Walker, Cypress, TX (US); Mark S. Tracy, Tomball, TX (US); Kenneth D. Reddix, Spring, TX (US); Brian D. Ryder, Tomball, TX (US); Adam G. Sanderson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 11/513,558

(22) Filed: Aug. 31, 2006

(65) Prior Publication Data
US 2008/0055827 A1    Mar. 6, 2008

(51) Int. Cl.
*G06F 1/16* (2006.01)
(52) U.S. Cl. .................. 361/679.41; 345/166; 250/221
(58) Field of Classification Search ......... 345/165–167; 381/679–687, 724–727; 250/221
See application file for complete search history.

(56) References Cited

U.S. PATENT DOCUMENTS

| | | | |
|---|---|---|---|
| 4,648,009 A | 3/1987 | Beun et al. | |
| 4,875,867 A | 10/1989 | Hoo | |
| 5,373,133 A | 12/1994 | Brockway et al. | |
| 5,601,349 A | 2/1997 | Holt | |
| 5,673,175 A | 9/1997 | Carney et al. | |
| 5,822,196 A | 10/1998 | Hastings et al. | |
| 5,989,043 A | 11/1999 | Han et al. | |
| 6,128,198 A | 10/2000 | Kurrer et al. | |
| 6,182,173 B1 | 1/2001 | Grosser et al. | |
| 6,232,676 B1 | 5/2001 | Kozyra et al. | |
| 6,634,898 B2 | 10/2003 | Clements | |
| 7,233,319 B2 * | 6/2007 | Johnson et al. | 345/166 |
| 7,298,362 B2 * | 11/2007 | Wang | 345/166 |
| 2007/0064385 A1 * | 3/2007 | Paul et al. | 361/687 |

\* cited by examiner

*Primary Examiner*—Hung V Duong

(57) ABSTRACT

In certain embodiments, a system comprises a computer housing, a device removably mounted to the computer housing, a removable component coupled to the computer housing under the device, and a power switch coupled to the removable component and responsive to separation of the device from the computer housing.

23 Claims, 4 Drawing Sheets

FIG. 3

AUTOMATIC POWER CONTROL

BACKGROUND

In certain electronic devices and computers, one or more components may be removable to facilitate service or upgrades. These removable components generally receive power and function with other components during operation of the electronic device or computer. As a result, it is generally recommended to shut-down the entire electronic device or computer prior to removing these components. Unfortunately, some users may remove components without first shutting down the electronic device or computer.

BRIEF DESCRIPTION OF THE DRAWINGS

Advantages of one or more disclosed embodiments may become apparent upon reading the following detailed description and upon reference to the drawings in which.

DETAILED DESCRIPTION OF SPECIFIC EMBODIMENTS

As discussed below, one or more components may be accessible after movement of some portion of the computer 10, wherein the component(s) may be accessible in one position of the component and inaccessible in another position of the portion. The portion of the computer 10 may include a user input device (e.g., a keyboard, pointing device, etc.), an access panel, another component (e.g., a hard drive, battery, etc.), a connector that mates with a component (e.g., a hinged electrical/mechanical connector), or another movable portion. The positions may be disposed along an accurate path of a hinge, a generally linear path, or a combination thereof. In certain embodiments, a switch, trigger, button, or actuator detects or senses the change in positions (e.g., mechanical/connection states) of the portion, and causes a change in the power state (e.g., power-on to power-off, or vice versa) of the respective component(s). As the portion changes positions, the change in power states may be concurrent, immediately after, delayed by a pre-set time delay, or after all pending operations of the component are complete. In certain embodiments, the mechanical/connection states may include a mechanically connected state and a mechanically disconnected state of the portion relative to the computer 10. In other embodiments, the mechanical/connection states may include an accessible position and an inaccessible position of the component relative to the portion of the computer 10. In this manner, once the components become accessible or susceptible to user removal, the power state may be changed from a power-on state to a power-off state, thereby protecting the component from potential damage.

Figure 1:
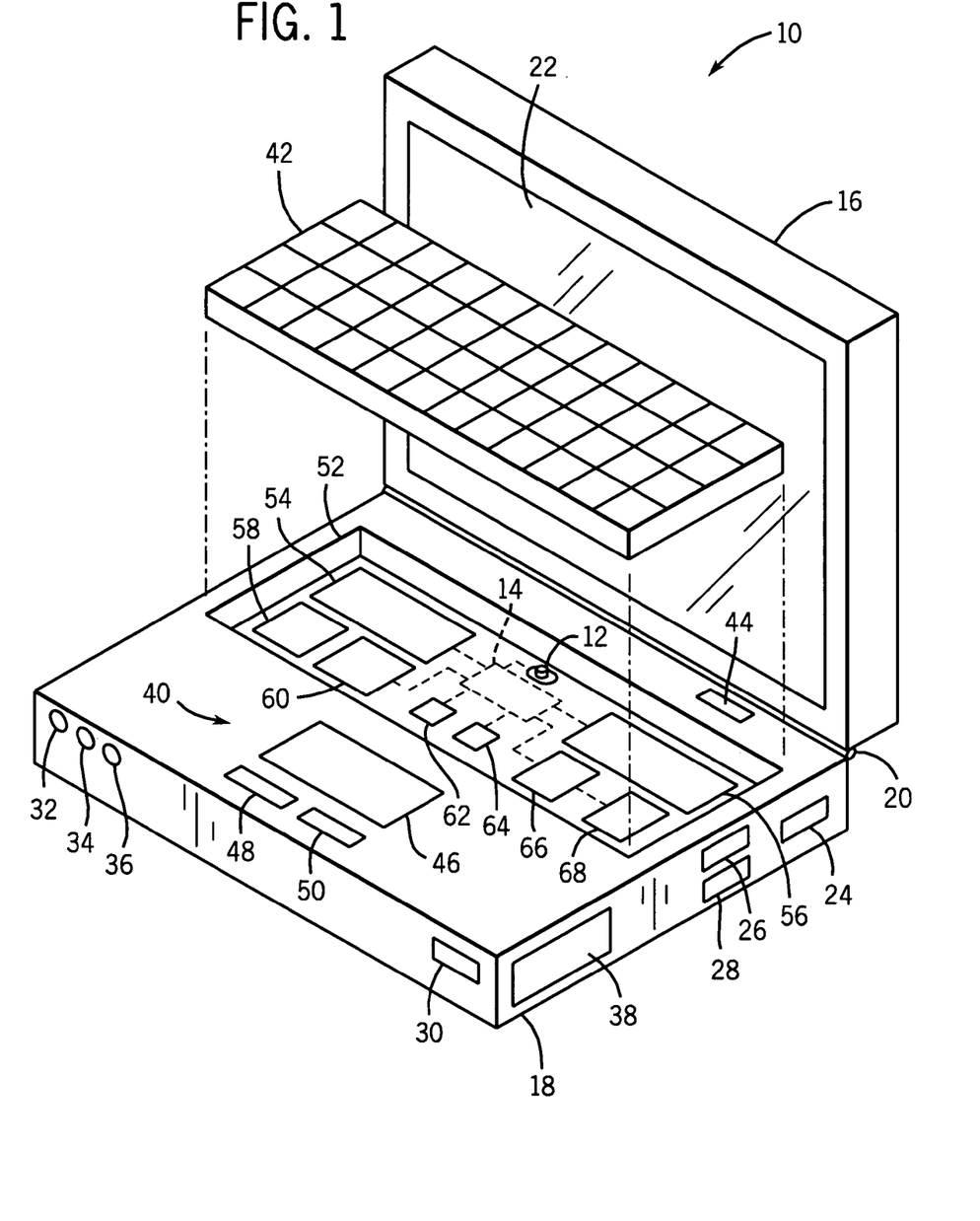
FIG. 1 is a perspective view of an exemplary electronic device or computer having an automatic trigger or button coupled to a component power controller disposed in a keyboard receptacle in accordance with an embodiment of the present invention.

FIG. 1 is a perspective view of an exemplary electronic device or computer 10 having an automatic trigger or button 12 coupled to a component power controller 14 in accordance with an embodiment of the present invention. As discussed in further detail below, the automatic trigger or button 12 generally effectuates a power shut-down for removable components, e.g., 54, 56, 58, 60, 62, 64, 66, and 68, disposed in a region or receptacle (e.g., keyboard receptacle 52) in response to removal of an access panel or a user input device (e.g., keyboard 42) from the receptacle 52 during a powered or operational state of the computer 10. In certain embodiments, the keyboard 42 may be replaced or combined with other user input devices, such as a mouse, a touch pad, a joystick, a display, a numeric keypad, a digitizer writing pad, a scanner, a camera, a microphone, a telephone, or a combination thereof. Alternatively, the keyboard 42 may be an access panel without any user input device, e.g., a hinged access panel in a suitable location on the computer 10. However, for simplicity but without limitation to the invention, the following embodiments relate to a keyboard 42, a pointing device 40, or a combination thereof. Again, the components 54-68 are generally disposed under some form of access panel or user input device, the removal of which triggers a change in the power state (e.g., switches from on to off) of the various components 54-68.

Specifically, a user gains access to the removable components 54-68 in the receptacle 52 under the keyboard 42 by separating or generally moving the keyboard 42 away from the keyboard receptacle 52. As the keyboard 42 is removed, the automatic trigger or button 12 (with or without the component power controller 14; for this reason, controller 14 is shown in dashed lines) shuts down power to the components 54-68 at least generally before the user can insert and/or remove the components 54-68. Again, the electronic device or computer 10 continues to operate and/or maintains power to other components, e.g., processor, while the user removes and/or inserts one or more components 54-68 powered down in response to the automatic trigger or button 12. In this manner, the automatic trigger or button 12 substantially reduces or eliminates the possibility of electrical damage to the components 54-68 and/or the computer 10 during component upgrades, replacements, servicing, removal, insertion, and so forth.

The power shut-down may comprise a generally controlled power-down sequence, or a generally immediate cut in the power, or a combination of these power control features associated with the various components 54-68, while the electronic device or computer 10 continues to operate. The automatic trigger or button 12 may function alone or in combination with the component power controller 14. For example, the automatic trigger or button 12 may function without the component power controller 14 to cut power to one or more of the components 54-68 immediately upon removal of the keyboard 42. By further example, the automatic trigger or button 12 may function with the component power controller 14 and/or software to initiate a controlled power-down sequence for one or more components 54-68. The controlled power-down sequence may comprise generally completing pending operations, rejecting new operations, and subsequently cutting power associated with one or more components 54-68. The controlled power-down sequence also may comprise cutting power for one or more components 54-68 after a time delay, e.g., 1, 2, 3, 4, 5, 6, 7, 8, 9, 10, or more seconds.

As illustrated in FIG. 1, the computer 10 comprises a display panel 16 coupled to a base or component housing 18 via a hinge 20. The display panel 16 further comprises a display screen 22, such as a liquid crystal display (LCD) screen or another suitable screen technology. The base or component housing 18 comprises a variety of internal and external components, which generally cooperate with one another during operation of the computer 10. Some exemplary components may comprise a processor, memory, a hard drive, an optical drive, a video card, an audio card, a network card, a wireless card, and combinations thereof. In the illustrated embodiment, the base or component housing 18 comprises a plurality of communication connectors 24, 26, 28, and 30, a plurality of status indicators 32, 34, and 36, an externally accessible drive or component 38, an integral pointing device 40, the removable keyboard 42, and a main power button 44. For example, the communication connectors, 24, 26, 28, and 30 can comprise a universal serial bus (USB) connector, an Institute of Electrical and Electronics Engineers (IEEE) 1394 connector, a serial bus connector, a parallel port connector, a network or modem connector, or another connector, or a combination thereof. In certain embodiments, the externally accessible drive or component 38 is an optical disc drive, such as a compact disc (CD) drive or a digital video disc (DVD) drive. The illustrated integral pointing device 40 comprises a touch pad 46 and associated left and right selection buttons 48 and 50 to facilitate user interaction with software displayed on the display screen 22.

In the exemplary embodiment of FIG. 1, the removable keyboard 42 is shown exploded from the keyboard receptacle 52, which comprises the automatic trigger or button 12 coupled to the plurality of removable components 54, 56, 58, 60, 62, 64, 66, and 68 via the component power controller 14. In certain embodiments, the automatic trigger button 12 cooperates with the component power controller 14 to automatically control power to the various removable components 54, 56, 58, 60, 62, 64, 66, and 68 in response to insertion or removal of the keyboard 42 with respect to the keyboard receptacle 52. For example, in one embodiment, if the removable keyboard 42 is released and lifted away from the keyboard receptacle 52, then the automatic trigger or button 12 sends a signal to the component power controller 14 to automatically shut-down power to the various removable components 54, 56, 58, 60, 62, 64, 66, and 68. In certain embodiments, the automatic trigger or button 12 is a mechanical push button, an optical switch, a magnetic switch, or a combination thereof.

The power shut-down may occur concurrently, or immediately after, or after a preset time delay, or after general completion of pending operations associated with the components 54-68. As mentioned above, in some embodiments, the automatic trigger or button 12 may function with or without the component power controller 14 to immediately cut the power to the various components 54, 56, 58, 60, 62, 64, 66, and 68 without any considerable delay. In other embodiments, the automatic trigger or button 12 may initiate control logic within the component power controller 14, such that one or more of the removable components 54, 56, 58, 60, 62, 64, 66, and 68 can complete pending operations in a controlled manner before shutting down the power. In other words, the component power controller 14 can simply provide a set amount of time generally sufficient for the various components 54-68 to complete pending operations or, alternatively, the component power controller 14 can monitor pending operations of the various components 54-68 and then subsequently shut-down the power to these components 54-68. Moreover, the component power controller 14 can power-down each of the various components 54-68 in a different manner. For example, the component power controller 14 can immediately shut-down power to some of the components, while allowing a set amount of time or monitoring pending operations of some of the other components.

In the illustrated embodiment of FIG. 1, the removable components 54-68 can comprise hard disc drives, network cards, memory cards, audio cards, video cards, and other various removable cards or components. For example, these cards may comprise a wireless access network (WAN) single inline memory module (SIMM) card, or a mini card, or a small outline dual inline memory module (SODIMM) card, or various other removable cards. Thus, as the removable keyboard 42 is released and lifted away from the keyboard receptacle 52, the automatic trigger or button 12 and the component power controller 14 immediately cuts power or initiates a controlled power shut-down to the various components 54-68 to enable safe removal of these components 54-68 while the computer 10 continues to operate. Thus, the computer 10 does not require a complete shut-down via the power button 44. Instead, the computer 10 and its various applications continue to function or hold in a standby mode, while the keyboard 42 is removed and various of the components 54-68 are accessed, removed, serviced, replaced, or upgraded in the keyboard receptacle 52.

In addition, the status indicators, 32, 34, and 36 may indicate the power status or controlled shut-down status of the various components 54-68 within the keyboard receptacle 52. For example, some embodiments of the status indicators 32, 34, and 36 comprise different colors, blinking patterns (fast, slow, repeating sets of two, three or more blinks, etc.), or other characteristics to indicate a power-on status, a power-off status, or a controlled power-down sequence associated with the components 54-68. By further example, the status indicators 32, 34, and 36 may be color-coded with a green light-emitting diode (LED) to indicate a power-on status of one or more of the components 54-68, a red LED to indicate a completely shut-down or no-power status of one or more of the components 54-68, and a yellow LED to indicate a controlled shut-down stage or status of one or more of the components 54-68. In this manner, the status indicators 32, 24, and 36 can assist with the installation and/or removal of the various components 54-68 within the keyboard receptacle 52. The removable keyboard 42 can be removably coupled to the keyboard receptacle 52 via a variety of fasteners, such as hooks, latches, snap-fit mechanisms, spring-loaded fasteners, compression fits, threaded fasteners, and so forth.

The various components 54-68 regain power as the removable keyboard 42 is lowered back into the keyboard receptacle 52. For example, the trigger or button 12 may return power to all or select ones of the components 54-68 as the keyboard 42 contacts the button 12 in the keyboard receptacle 52 and covers the components 54-68 underneath. However, if one or more of the components 54-68 are not installed in the keyboard receptacle 52 under the keyboard 42, then the power may remain off or switch off as the keyboard 42 is lowered into the receptacle 52. For example, in some embodiments, the controller 14 detects whether or not the various components 54-68 are currently coupled to their respective connectors (e.g., the electrical/mechanical connection state—connected or disconnected). In response, the controller 14 maintains or changes the power state, e.g., power-on or power-off. More specifically, if the controller 14 detects that a particular component 54-68 is currently resident (i.e., connected state), then the controller 14 maintains or returns power (i.e., power-on state) to the particular component 54-68. Alternatively, if the controller 14 detects that a particular component 54-68 is currently missing, malfunctioning, or otherwise undetectable (i.e., mechanically disconnected, released, or undetectable state), then the controller 14 maintains or returns power (i.e., power-on state) to the particular component 54-68. In further embodiments, the trigger or button 12 may not return power to any of the components 54-68 upon lowering the keyboard 42 into the receptacle 52, but rather another external button (e.g., a button on the keyboard) may be used to return power to the various components 54-68. Alternatively, the user may interact with a software interface displayed on the screen 22 to selectively control power to the various components 54-68. For example, the software interface may display the components detected by the controller 14, and then enable the user to control or confirm the power state (e.g., power-on or power-off).

Figure 2:
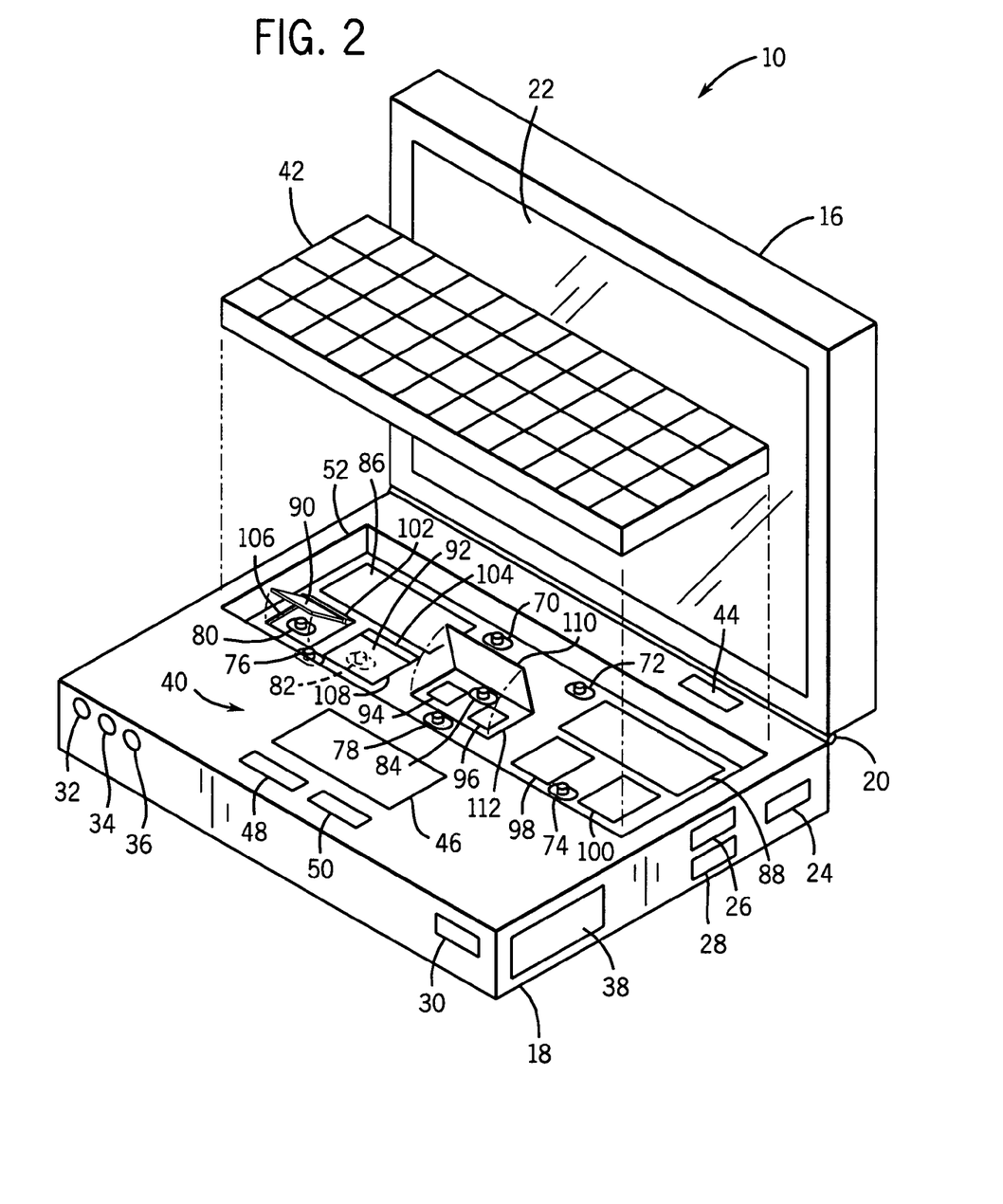
FIG. 2 is a perspective view of an alternative embodiment of an electronic device or computer having a plurality of primary automatic triggers and a plurality of secondary automatic triggers disposed in the keyboard receptacle.

FIG. 2 is an alternative embodiment of the electronic device or computer 10 having a plurality of primary automatic triggers or buttons 70, 72, 74, 76, and 78 and a plurality of secondary automatic triggers or buttons 80, 82, and 84 to control power and/or controlled power shut-down procedures of various removable components 86, 88, 90, 92, 94, 96, 98, and 100. In the illustrated embodiment, the primary automatic triggers or buttons 70-78 generally operate in the same manner as described above with reference to automatic trigger or button 12 of FIG. 1. In other words, as the keyboard 42 is released and lifted away from the keyboard receptacle 52, the primary automatic triggers or buttons 70-78 automatically control power to the respective components 86-100. For example, in some embodiments, the primary automatic triggers or buttons 70, 72, and 74 automatically cut power to the removable components 86, 88, 98, and 100 when the keyboard 42 is removed from the keyboard receptacle 52. In certain embodiments, one or more of these primary automatic triggers or buttons 70, 72, and 74 initiates a controlled power shut-down of the respective components 86, 88, 98, and 100.

In contrast, in some embodiments, the primary automatic triggers or buttons 76 and 78 do not automatically cut power to the associated components 90, 92, 94, and 96, but rather the primary automatic triggers or buttons 76 and 78 initiate a controlled shut-down of the respective components 90-96. In other words, the primary automatic triggers or buttons 76 and 78 may provide a set amount of time or monitor functions of the various components 90-96 to enable pending operations to complete prior to power shut-down. In this embodiment, the removable components 90-96 are also associated with the secondary automatic triggers or buttons 80, 82, and 84, which automatically cut power to the various components 90-96 if additional access is attempted with respect to the specific components 90, 92, 94, or 96.

For example, the illustrated components 90 and 92 are removably coupled to hinged connectors 102 and 104, which are configured to mate with and enable the removable components 90 and 92 to pivot inwardly and outwardly relative to component receptacles 106 and 108. As illustrated in FIG. 2, the removable component 90 is disposed in an angled position (e.g., rotated about an axis) relative to the receptacle 106 via the hinged connector 102. The angled position may be defined as an unsecured position, because the component 90 can now be removed. In contrast, the component 92 remains secured (i.e., a secured position) within the receptacle 108. As the components 90 and 92 are pivoted outwardly from the receptacle 106 and 108, the secondary automatic triggers 80 and 82 automatically cut power to the respective components 90 and 92. In other words, the triggers 80 and 82 may cut power generally concurrent with or immediately after movement of the components 90 and 92. Thus, the primary automatic triggers or buttons 76 and 78 provide a controlled shut-down of the components 90 and 92, while the secondary automatic triggers or buttons 80 and 92 provide an automatic shut-down to ensure that the components 90 and 92 are not removed prior to complete power shut-down of respective components 90 and 92. In other words, the controlled shut-down may be defined as a delayed shut-down that enables the pending operations to complete prior to removing the power to the particular component. In some embodiments, the controlled shut-down provides a pre-set time limit, e.g., 1, 2, 3, 4, 5, 6, 7, 8, 9, 10, or more seconds. In other embodiments, the controlled shut-down allows all operations to complete despite the passing time, while not allowing further operations to begin on the particular component. In contrast, the automatic shut-down does not provide time to complete pending operations, but rather immediately removes power to the particular component. In some embodiments, the automatic shut-down may provide a relatively short time delay, for example, 1-2 seconds or less.

Similarly, the removable components 94 and 96 are coupled to the secondary automatic trigger or button 84 below a hinged door 110. As the hinged door 110 rotates open relative to a component receptacle 112, the secondary automatic trigger or button 84 automatically cuts all power to the associated components 94 and 96 disposed within the receptacle 112. In other words, the primary automatic trigger or button 78 initiates a controlled power-down of the components 94 and 96, while the secondary automatic trigger or button 84 functions to immediately cut all power to the associated components 94 and 96.

Given that the power to the various removable components 86-100 is automatically shut-down via the primary automatic triggers 70-78 and/or the secondary automatic triggers 80-84, the respective components 86-100 can be safely accessed, removed, replaced, upgraded, serviced, or generally exchanged while the computer 10 continues to operate in a powered state. These removable components 86-100 can be reinstalled and repowered in a similar manner as discussed above with reference to FIG. 1. In certain embodiments, power is not returned to the various components 86-100 until the primary automatic triggers or buttons 70-78 are engaged by the keyboard 42 as the keyboard 42 is lowered into the keyboard receptacle 52. In some embodiments, power may be returned to the components 90-96 via the secondary automatic triggers or buttons 80-84. For example, the secondary automatic triggers or buttons 80 and 82 can return power to the components 90 and 92 upon rotating the components 90 and 92 back down into the receptacles 106 and 108. Similarly, the secondary automatic trigger or button 84 can automatically return power to the components 94 and 96 upon rotating the hinged door 110 back down onto the receptacle 112. However, some embodiments of the secondary automatic triggers or buttons 80-84 may not return power to the respective components 90-96, but rather the primary automatic triggers 70-78 may restore power to all of the components 86-100 only after reinstalling the keyboard 42 into the receptacle 52.

Figure 3:
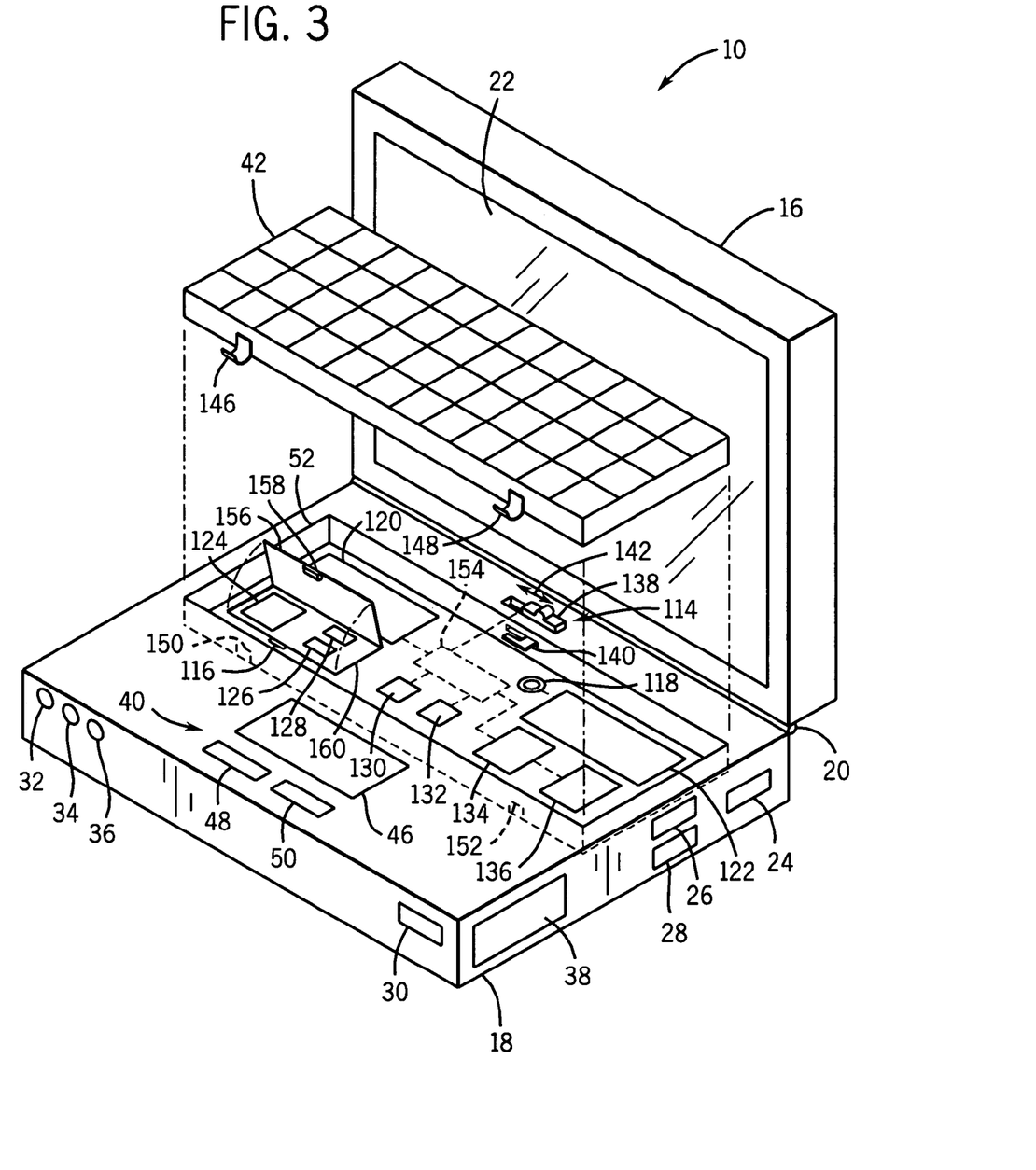
FIG. 3 is a perspective view of an alternative embodiment of an electronic device or computer having a plurality of electromechanical actuators configured to provide physical access and control power to various components disposed within a keyboard receptacle.

FIG. 3 is a perspective view of another embodiment of the electronic device or computer 10 having a primary multi-function or electromechanical actuator 114 and secondary multi-function or electromechanical actuators 116 and 118 configured to simultaneously control a power state (e.g., power-on state and power-off state) and a mechanical access connection state (e.g., connected state and disconnected/released state) associated with a plurality of removable components 120, 122, 124, 126, 128, 130, 132, 134, and 136 disposed within the keyboard receptacle 52. The illustrated primary electromechanical actuator 114 is configured to simultaneously release the removable keyboard 42 from the keyboard receptacle 52 and automatically shut-down power to the removable components 120, 130, 132, 134, and 136.

Specifically, the primary electromechanical actuator 114 comprises a slidable member 138 coupled to a latch or hook member 140, such that the latch or hook member 140 engages or disengages a mating portion of the removable keyboard 42 as the slidable member 138 moves in a linear direction as indicated by arrow 142. The removable keyboard 42 also may comprise latch or hook members 146 and 148, which removably extend into mating hook receptacles 150 and 152 in the keyboard receptacle 52 opposite from the latch or hook member 140. In the illustrated embodiment, the keyboard 42 is removed from the keyboard receptacle 52 by moving the slidable member 138 to disengage or release the hook member 140 from the keyboard 42, and then rotating the keyboard upwardly about the hook members 146 and 148 within the mating hook receptacles 150 and 152 until the hook members 146 and 148 can be removed from the mating hook receptacles 150 and 152. Upon releasing the keyboard 42 via the slidable member 138, the primary electromechanical actuator 114 operates alone, or cooperates with a component power controller 154, to simultaneously shut-down power to components 120, 130, 132, 134, and 136. In certain embodiments, the primary electromechanical actuator 114 cooperates with the component power controller 154 to initiate a controlled power shut-down of the removable components 120, 130, 132, 134, and 136 rather than an immediate power shut-down.

In the illustrated embodiment of FIG. 3, the primary electromechanical actuator 114 and the component power controller 154 do not automatically shut-down power to the removable components 124, 126, and 128. Instead, the secondary electromechanical actuator 116 simultaneously shuts down power to the removable components 124, 126, and 128, while also releasing a hinged door 156 disposed over the removable components 124, 126, and 128. Specifically, the secondary electromechanical actuator 116 releases a latch 158 disposed on the hinged door 156, thereby enabling the hinged door 156 to rotate outwardly from a component receptacle 160 containing the removable components 124, 126, and 128.

Similarly, the secondary electromechanical actuator 118 simultaneously shuts down power to the removable component 122, while also disengaging or releasing the component 122 from the keyboard receptacle 52. For example, the secondary electromechanical actuator 118 may comprise a flush push button that is not engaged by insertion or removal of the keyboard 42 with respect to the keyboard receptacle 52. In certain embodiments, the secondary electromechanical actuator 118 may cut power (e.g., changes a power state from a power-on state to a power-off state) to the removable component 122 in a downward motion of the actuator 118, and subsequently releases and/or raises the removable component 122 in an upward motion of the actuator 118 (e.g., changes mechanical connection state from an inaccessible/connected/secured state to an accessible/released/unsecured state). Alternatively, the secondary electromechanical actuator 118 may cut power to the removable component 122 in a first distance of a downward motion of the actuator 118, and subsequently release and/or raise the removable component 122 in a further downward motion of the actuator 118. Thus, in the illustrated embodiment, the primary and secondary electromechanical actuators 114, 116, and 118 enable simultaneous power control and mechanical or physical access control with respect to the various removable components 120-136.

Figure 4:
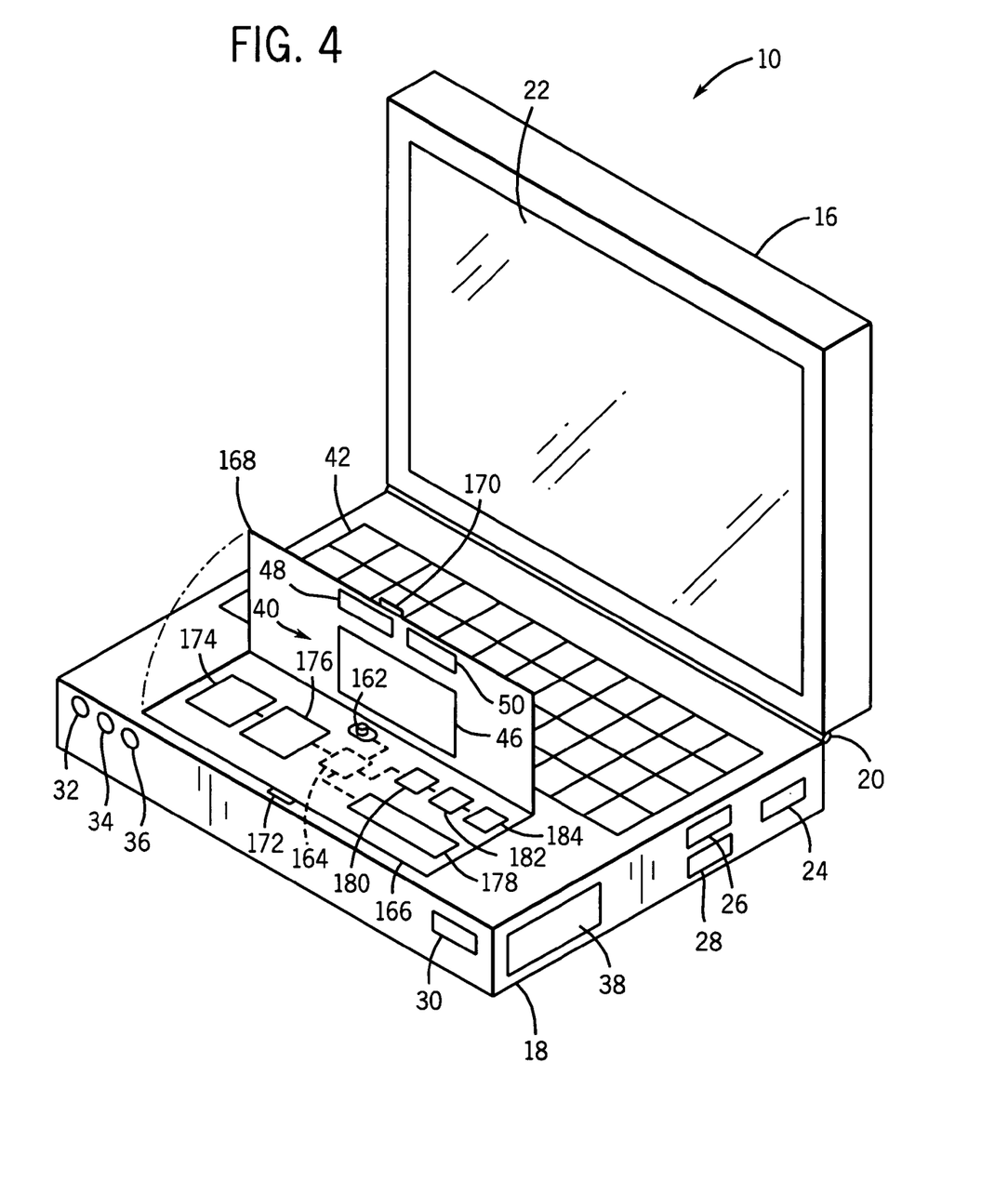
FIG. 4 is a perspective view of a further alternative embodiment of an electronic device or computer having an automatic trigger or button coupled to a component power controller disposed in a receptacle below a door adjacent a keyboard.

FIG. 4 is a perspective view of another embodiment of the electronic device or computer 10 having an automatic trigger or button coupled to a component power controller 164 disposed in a receptacle 166 below a hinged access door 168 adjacent the keyboard 42. In the illustrated embodiment, the hinged access door 168 supports the integral pointing device 40 having the touch pad 46 and buttons 48 and 50. The illustrated hinged access door 168 comprises a latch or hook member removably coupled to the receptacle 166 via a latch release 172. After engaging the latch release 172, the hinged access door 168 can rotate upwardly away from the receptacle 166, thereby providing access to a plurality of removable components 174, 176, 178, 180, 182, and 184. In addition, the automatic trigger or button 162 cooperates with the component power controller 164 to immediately cut power or initiate a controlled power shut-down of the various components 174-184 upon raising the hinged access door 168 away from the receptacle 166 and the automatic trigger or button 162.

Again, as discussed above, the automatic trigger or button 162 can cooperate with the component power controller 154 to cut power immediately to some of the components, while enabling a controlled shut-down of various other components. The controlled shutdown may comprise a pre-set time delay followed by automatic shut-down of the respective components. Alternatively, the controlled shut-down can comprise monitoring pending operations of a particular component, preventing further operations to begin on the respective component, and automatically shutting down power to the respective component after completion of the pending operations. In this manner, the automatic trigger or button 162 and the component power controller 164 ensure that power is removed from the various components 174-184 prior to any attempts to remove the components. Thus, a user can safely access, remove, replace, service, or upgrade the various components 174-184 without power being supplied to the respective components 174-184, while the computer 10 continues to operate and supply power to other components elsewhere in the computer 10. Again, the automatic trigger or button 162 cooperates with the component power controller 164 to restore power to the respective components 174-184 upon lowering and reattaching the hinged access door 168 via the latch or hook member 170 and the latch release 172.

What is claimed is:

1. A system, comprising:
    a computer housing;
    a device removably mounted to the computer housing;
    a removable component coupled to the computer housing under the device, wherein the removable component is positioned between the device and an interior section of the computer housing; and
    a power switch coupled to the removable component, wherein the power switch controls power delivery to the removable component and wherein the power switch is responsive to separation of the device from the computer housing to cause the power delivery to the removable component to be ceased in response to the device being separated from the computer housing, wherein the removable component is configured to remain within the computer housing when the device is separated from the computer housing.

2. The system of claim 1, wherein the power switch comprises a trigger coupled to a component power controller.

3. The system of claim 1, wherein the power switch is configured to cut power to the removable component at a time generally concurrent with or immediately after separation of the device from the computer housing.

4. The system of claim 1, wherein the power switch is configured to enable the removable component to at least substantially complete pending operations and subsequently cut power to the removable component.

5. The system of claim 4, comprising an additional power switch coupled to the removable component and responsive to movement of a structure between secured and unsecured positions with respect to the removable component.

6. The system of claim 5, wherein the structure comprises a component cover, or a hinged support member, or a combination thereof.

7. The system of claim 5, wherein the additional power switch is configured to cut power to the removable component at a time generally concurrent with or immediately after movement of the structure from the secured position to the unsecured position.

8. The system of claim 1, wherein the power switch comprises a push button, or an optical switch, or a magnetic switch, or a combination thereof 9. The system of claim 1, comprising an electromechanical actuator having the power switch and a mechanical release configured to release the device from the computer housing.

10. The system of claim 1, comprising an additional removable component coupled to the computer housing under the device, and an electromechanical actuator having an additional power switch coupled to the additional removable component, wherein the electromechanical actuator comprises a mechanical release configured to release the additional removable component from the computer housing.

11. The system of claim 1, wherein removable component comprises a memory card, or a network card, or a wireless card, or a hard disk drive, or a combination thereof.

12. The system of claim 1, wherein the device comprises a keyboard, or a pointing device, or a combination thereof.

13. The system of claim 1, wherein the device comprises an access panel.

14. A system, comprising:
a portable computer, comprising:
a device removably mounted to a housing of the portable computer;
a removable component positioned within the portable computer between the device and an interior section of the portable computer; and
a power control feature coupled to the removable component, wherein the power control feature controls power delivery to the removable component and wherein the power control feature is responsive to movement of the device from a first position to a second position to cause the power delivery to the removable component to be ceased when the device is separated from the portable computer, wherein the device generally secures the removable component within the portable computer when the device is in the first position and the device generally enables release of the removable component from within the portable computer when the device is in the second position, and wherein the removable component is configured to remain within the portable computer when the device is in the second position.

15. The system of claim 14, wherein the device comprises a keyboard, or a pointing device, or a combination thereof.

16. The system of claim 14, wherein the device comprises a hinged access door disposed over the removable component.

17. The system of claim 14, wherein the device comprises a hinged electrical connector configured to mate with the removable component.

18. The system of claim 14, wherein the power control feature comprises a multi-function actuator configured to change a power state of the removable component and change a mechanical connection state of the removable component.

19. The system of claim 18, wherein the multi-function actuator is configured to change the power state from a power-off state to a power-on state and subsequently change the mechanical connection state from a connected state to a released state.

20. The system of claim 14, comprising a plurality of removable components comprising the removable component, and a plurality of power control features comprising the power control feature, wherein the plurality of power control features comprises a first feature configured to cut component power without any substantial delay and a second feature configured to initiate a controlled component shut-down.

21. A method for automatic control of power delivery to a removable component in a computer housing, wherein the removable component is coupled to the computer housing under a device that is removably mounted to the housing, and wherein the removable component is positioned between the device and an interior section of the computer housing, said method comprising:
automatically changing a power state of the removable component, while the removable component remains within the computer housing in response to the device being separated from the housing.

22. The method of claim 21, wherein automatically changing comprises sensing separation of the device from the portable computer.

23. The method of claim 21, wherein automatically changing comprises concurrently changing the power state and mechanically releasing the device from the region on the portable computer.

* * * * *

UNITED STATES PATENT AND TRADEMARK OFFICE
CERTIFICATE OF CORRECTION

| | | |
|---|---|---|
| PATENT NO. | : 7,551,428 B2 | Page 1 of 1 |
| APPLICATION NO. | : 11/513558 | |
| DATED | : June 23, 2009 | |
| INVENTOR(S) | : Steven S. Homer et al. | |

It is certified that error appears in the above-identified patent and that said Letters Patent is hereby corrected as shown below:

In column 1, line 51, delete "accurate" and insert -- arcuate --, therefor.

Signed and Sealed this

Twenty-sixth Day of January, 2010

David J. Kappos
*Director of the United States Patent and Trademark Office*